United States Patent [19]

Bracka

[11] 3,921,942
[45] Nov. 25, 1975

[54] RUDDER BOUNDARY LAYER CONTROL DEVICE

[75] Inventor: Bruno W. Bracka, La Mesa, Calif.

[73] Assignee: General Dynamics Corporation, San Diego, Calif.

[22] Filed: July 1, 1974

[21] Appl. No.: 484,633

[52] U.S. Cl. .................................................. 244/87
[51] Int. Cl.² ........................................... B64C 21/02
[58] Field of Search............244/87, 42 CC, 42 CB, 244/42 DA, 42 C, 42 DB, 52

[56] References Cited
UNITED STATES PATENTS

| | | | |
|---|---|---|---|
| 2,169,416 | 8/1939 | Griswold | 244/42 DB |
| 2,334,975 | 11/1943 | Williams | 244/42 DA |
| 2,387,526 | 10/1945 | Nagamatsu | 244/87 X |
| 2,484,359 | 10/1949 | Tipton | 244/87 |
| 2,608,365 | 8/1952 | Badenoch | 244/87 |
| 2,974,904 | 3/1961 | Fielding et al. | 244/42 CC |
| 3,131,873 | 5/1964 | Sanders | 244/42 DA X |
| 3,145,950 | 8/1964 | Circenis | 244/42 DB |
| 3,438,598 | 4/1969 | Tammel | 244/42 DA |
| 3,493,196 | 2/1970 | McCall | 244/42 DA |
| 3,655,149 | 4/1972 | Williams | 244/42 DA |
| 3,677,504 | 7/1972 | Schwarzler | 244/42 CC |

FOREIGN PATENTS OR APPLICATIONS

| | | | |
|---|---|---|---|
| 1,506,615 | 8/1969 | Germany | 244/42 DA |
| 304,128 | 4/1929 | United Kingdom | 244/42 DB |

*Primary Examiner*—Trygve M. Blix
*Assistant Examiner*—Barry L. Kelmachter
*Attorney, Agent, or Firm*—John R. Duncan; Hugo F. Mohrlock

[57] ABSTRACT

A control device for an aircraft airfoil, particularly adapted for double or single slotted rudders. A set of operable doors is located flush in the fin skin on both sides near the trailing edge. The rudder is mounted to the fin by a primary and secondary pivot and a track-roller device, and is actuated by a fluid piston-cylinder which is connected to the fin and to a crank rotatable around the primary pivot. As the rudder is deflected, the fin doors on the side to which the rudder is deflected will open, while the doors on the opposite side of the fin remain closed. A gap between the fin and rudder is widened on the opposite side from the opened doors by the translation-rotation movement of the rudder, resulting in a smooth convergent slot having its entrance at the opened doors and its exit at the enlarged gap on the opposite side of the airfoil.

2 Claims, 5 Drawing Figures

RUDDER BOUNDARY LAYER CONTROL DEVICE

BACKGROUND OF THE INVENTION

The invention relates to aircraft controls and more specifically to the control surface of an aircraft vertical fin or other airfoil having the capability of deflecting the surface to either side of the airfoil centerline.

In the design of modern aircraft, such as for example Short Takeoff and Landing (STOL) aircraft, it has become urgent that a more efficient rudder be developed. A conventional rudder must be very large in order to develop the side-force necessary to control a STOL aircraft at slow airspeed under conditions of asymmetric thrust or crosswind landing. Such a large rudder imposes drag and weight penalties which degrade the performance of the aircraft. While much work has been done on flaps and other high-lift devices for aircraft wings, very little development has been done on rudders or other primary control surfaces. In the case of wing high-lift devices such as leading edge and trailing edge flaps, these devices are usually only utilized during the takeoff and landing mode. Actuation mechanisms may therefore be slow operating and limited to deflecting the surface to only one side of the wing. Primary control surfaces on the other hand must be capable of deflection to either side of the main airfoil, must have quick response, and must be operable essentially constantly during the entire flight. Such requirements compound the problem of providing boundary layer control and high lift characteristics to primary control surfaces such as rudders.

Hugo Junkers disclosed in British Pat. No. 304,128 — Convention Date (Germany) Jan. 14, 1928 — the problem of rudder control then existing and his solution:

"...In these known types, the flow of air round the control surface is unfavourably affected by the proposed fin, even under comparatively slight deflections of the surface, and when the surface is turned through a greater angle, the flow readily becomes unsteady (so-called "broken flow"), which causes irregularities in the action of the surface, whereby the effect of the control gear is lessened and its manipulation rendered difficult.

"The invention has for its object to obviate these drawbacks, and therefore, primarily to strengthen the effect of the rudder.

"According to the invention, the pivotal axis of the control surface (which is of streamline cross section) is removed to a position forward of the leading edge of the surface and into the area of the tapered trailing edge of the fin. The result of this arrangement is that in the event of angular displacement of the surface in relation to the fin — the direction being immaterial — a nozzle-like slot or gap is formed between the trailing edge of the fin and the leading edge of the surface, through which gap air can pass from the pressure side of the control gear to the suction side. There is consequently produced in the new control gear the slot effect which is already known in connection with wings, and which has the effect of preventing the breaking of the air flow until the control surface has been deflected to a substantially greater degree than in the absence of the slot. The atmospheric forces acting on the control surface are, therefore, greater, so that the effect of the surface is substantially greater than can be obtained with the known control gear. Moreover, the value and torque of the atmospheric force acting on the control surface, and depending on the angle of deflection of the surface for the time being, take a more uniform course, and this improved evenness of the surface torque facilitates steering."

Thus the principle of aerodynamic boundary layer control was applied to an aircraft rudder many years ago. The trailing edge of the fin was brought to a point ahead of the rudder in order to obtain a slot when the rudder deflected. In the neutral or streamlined rudder position there existed a loss of continuity in the surfaces that was of little significance to the aircraft of that era, but would cause excess drag for today's high-speed aircraft. Additionally the single fixed pivot arrangement does not permit the degree of tailoring of the slot which is required for today's aircraft.

The device of U.S. Pat. No. 2,484,359 to W. D. Tipton provided "...a slot or jet action over the displaced surface whereby turbulence is reduced and the effectiveness of the control surface is increased." This is accomplished by a plurality of conduits in the vertical stabilizer which has one end open to the atmosphere at the leading edge of the stabilizer and the opposite end discharging an airstream along the rudder on the deflected side .... a jet action being produced which washes off the boundary layer and prevents undesirable turbulence."

Since boundary layer control relies on substantial airflow through the slot, such a duct arrangement will not deliver sufficient air at all deflections. Additionally, as the rudder is deflected and the aircraft yaws, the angle of attack of the stabilizer or fin increases, and the efficiency of the duct inlets on the fin leading edge is degraded due to a reduction in ram pressure at the time when maximum slot flow is required.

Another method of boundary layer control is taught by Hans-Jurgen Schwarzler in U.S. Pat. No. 3,677,504. A cover member disposed on the pressure side of the fin is arranged to be outwardly movable by means of guides to form an inlet funnel when the rudder is pivoted. The rudder is disposed outside of the center of its nose curvature in such a manner that it creates an outlet on the suction side when the rudder is pivoted. Such an arrangement increased drag by disposing the cover member into the airstream.

Thus it may be seen that difficulties remain in the efficient boundary layer control of aircraft rudder systems, and a need exists for rudders that may be displaced through larger angles without high drag rise, so that rudder size may be reduced and yet yield the same side-force required to yaw the aircraft.

SUMMARY OF THE INVENTION

It is an object of the present invention to provide an arrangement and control mechanism for a primary control surface such as a rudder that will utilize the high lift advantages of slotted, multi-element airfoil sections.

It is an object of the present invention to provide a double-slotted rudder arrangement permitting large deflections of the rudder elements in both directions while varying the slot dimensions in proportion to the amount of rudder deflection whenever the rudder is deflected beyond a prescribed minimum angle, as well as to provide an arrangement in which there is no significant gap between the elements when the rudder is in the neutral or streamlined position.

It is an object of the present invention to provide a rudder with a greater deflection range to produce higher lift (side-force on the aircraft) without air flow separation from the rudder, and therefore without unacceptable drag rise.

It is an object of the present invention to vary the slot dimensions by increasing the entrance door opening and the exit gap size as a function of rudder deflection from the neutral position.

These objects, as well as others, are accomplished according to the present invention by utilizing a new and novel control device wherein a single actuator controls the amount of surface deflection, and interconnecting linkages control the amount of opening of a plurality of entrance doors, while a second set of linkages controls the exit gap dimension by translating the rudder aft proportionally to the amount of rudder pivot, thereby permitting airflow to be conducted through the slot thus formed from the pressure side to the suction side of the airfoil.

In order to achieve a quick response rudder, a single actuator is utilized to deflect the rudder, open the entrance doors, and increase the exit gap, to thereby eliminate any time delays associated with the sequencing of a plurality of actuators disposed to perform each of these functions separately. Additionally, for small rudder deflections where flow separation is not a problem, the slot is not formed since the entrance doors do not open and the exit gap is not formed.

DESCRIPTION OF THE PREFERRED EMBODIMENTS

Figure 1:
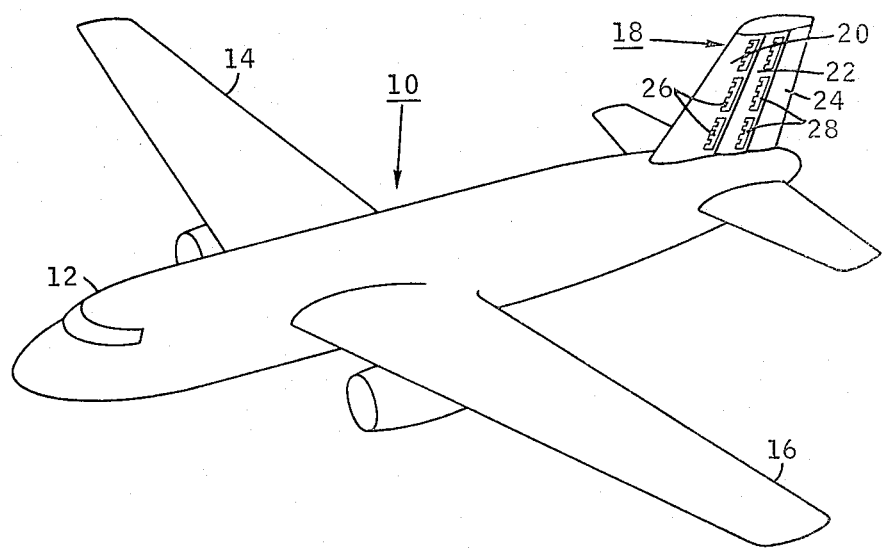
FIG. 1 is a perspective view of a STOL aircraft incorporating a double-slotted rudder to which the present invention is particularly applicable.

Referring now to the drawings in detail, FIG. 1 illustrates an aircraft 10 having a fuselage 12, wings 14 and 16, and a double slotted vertical stabilizer 18, comprising a vertical fin 20, a first rudder element 22, and a second rudder element 24. A set of three doors 26 is located flush in the fin skin symmetrically on both sides near the trailing edge. Another set of doors 28 is located in a like manner near the trailing edge of the first rudder element 22. Each of the door assemblies 26 and 28 are substantially identical, as are the actuation means and attachments of second rudder element 24 to first element 22 and first element 22 to fin 20, and this invention will be described by the relationship of second element 24 to first element 22, it being understood that this invention is to be employed on both rudder elements 22 and 24. It also should be understood that the description hereinafter will also apply to a single element rudder attached to a fin in the more conventional arrangement of a vertical stabilizer.

Figure 2:
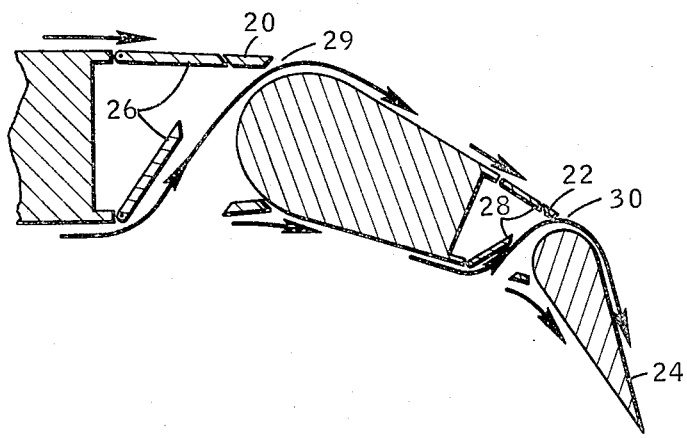
FIG. 2 is a schematic illustration of the air flow through the slot when the rudder is deflected.

Referring to FIG. 2, there is shown a sectional view of the first rudder element 22 and second rudder element 24 in the neutral position and in an intermediately displaced position to illustrate the slots provided by the opening of entrance doors 26 and 28 on the pressure side and the gaps 29 and 30 on the suction side. Gap 30 is formed by the aft translation and rotation of rudder 24 away from the trailing edge of element 22, thereby providing a smooth flow-through of air from the pressure side to the suction side of rudder 24. In a like manner gap 29 is formed between element 22 and fin 20.

Figure 3:
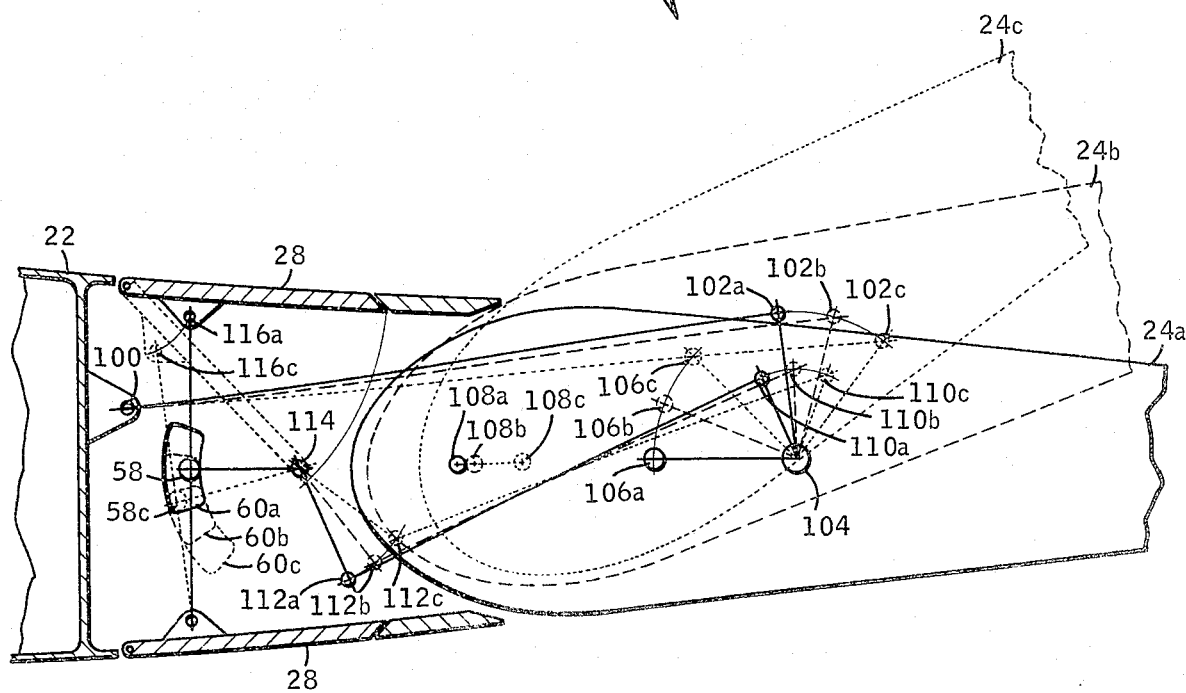
FIG. 3 is a schematic illustration of the linkage geometry showing the rudder positioned at neutral, partially deflected, and fully deflected.

In FIG. 3 there is shown an enlarged sectional view of the rudder 24 in the neutral position 24a, solid lines, in a partially deflected position 24b, dashed lines, and in the fully deflected position 24c, dotted lines. In a like manner linkages and pivot points are shown with solid, dashed, and dotted lines to illustrate their corresponding locations with rudder 24 respectively in the position of neutral, partially deflected, and fully deflected.

Figure 4:
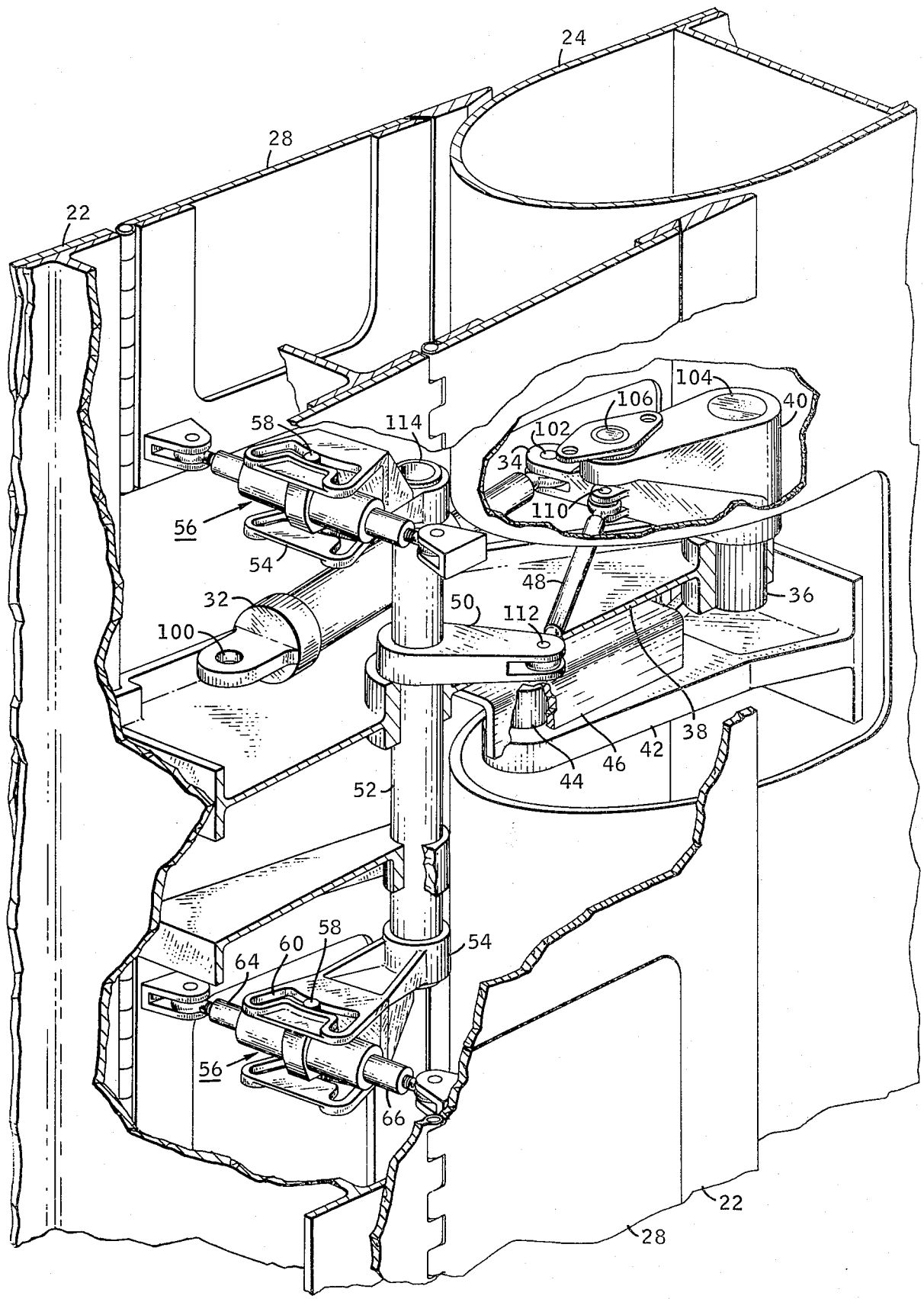
FIG. 4 is a side view showing the actuator and associated linkages for controlling the rudder deflection and entrance door opening.

Referring to FIGS. 4 and 3 wherein the same pivot point has the same number in both figures and wherein the pivot point is further identified in FIG. 3 by a subscript $a$, $b$, and $c$ to indicate its location for the three rudder positions described, it will be seen that a linear actuator 32 is connected to element 22 at 100 and to crank 34 at 102. Any suitable linear actuator may be used, it being preferred to use a fluid piston-cylinder actuator. Crank 34 is rigidly attached to torque tube 36 such that extension or retraction of actuator 32 will produce rotation of torque tube 36 around the primary pivot 104. Torque tube 36 is rotatably mounted within torque tube mounting bracket 38 which is an integral part of the structure of first rudder element 22. Rigidly attached to torque tube 36 is a second crank 40 which is rotatably attached to rudder 24 at the secondary pivot 106. Secondary pivot 106 is located on the centerline of fin 24 and primary pivot 104 is located on the centerline of element 22.

Bracket 42 is an integral part of the rudder 24 structure and carries a track roller 44 rotatably mounted thereto at the forward end at point 108. A track 46 is attached to and forms a structural part of rudder forward element 22 and is located along the centerline of element 22. Track 46 is a channel section and acts as a guide for track roller 44 to slide therein, and thereby limits the motion of point 108 to linear travel along the centerline of the first rudder element 22.

Thus it may be seen that in the neutral position pivot points 104, 106a, and 108a are located on a common centerline of first rudder element 22 and second rudder element 24. As actuator 32 is extended and produces rotation of torque tube 36, point 106 rotates to position 106b and roller 44 slides aft in track 46 to position 108b. Since secondary pivot 106b is a part of and located on the centerline of rudder 24, as is roller pivot 108b, these two points establish the position of the rudder which has rotated and translated to position 24b, since the centerline of the rudder will always include pivot points 106 and 108. Additional extension of actuator 32 causes additional rotation of torque tube 36 and arcual motion of the secondary pivot to position 106c, while roller 44 slides aft in track 46 to position 108c, thereby locating the rudder in position 24c.

Entrance doors 28 may be spring biased outward in the closed position with sufficient force to remain closed in straight flight. Under yaw conditions where sufficient pressure differential exists the doors on the pressure side may overcome their spring bias to permit high energy air to enter through the doors and be injected into retarded air flow on the suction side by means of the gap between element 22 and rudder 24. That is to say, doors 28 would operate as "blow-in doors." Such an arrangement would prove quite satisfactory for many rudder arrangements, however the preferred embodiment includes positive control and positioning of the inlet doors, and the means for accomplishing this control will now hereinafter be described.

Rotatably attached to crank 34 at pivot point 110 is a control rod 48. Control rod 48 is attached at its other end to horn 50 and is free to pivot thereon around point 112, and horn 50 is rigidly attached to torque tube 52 which is rotatably mounted in torque tube mounting bracket 38 to freely rotate therein. Rigidly mounted to torque tube 52 are door control yokes 54, each yoke located on torque tube 52 in the vicinity of a pair of inlet doors 28. Two of these door control yokes 54 are shown in FIG. 4. The door control yokes 54, torque tube 52, and horn 50 rotate about point 114 of FIGS. 3 and 4.

Figure 5:
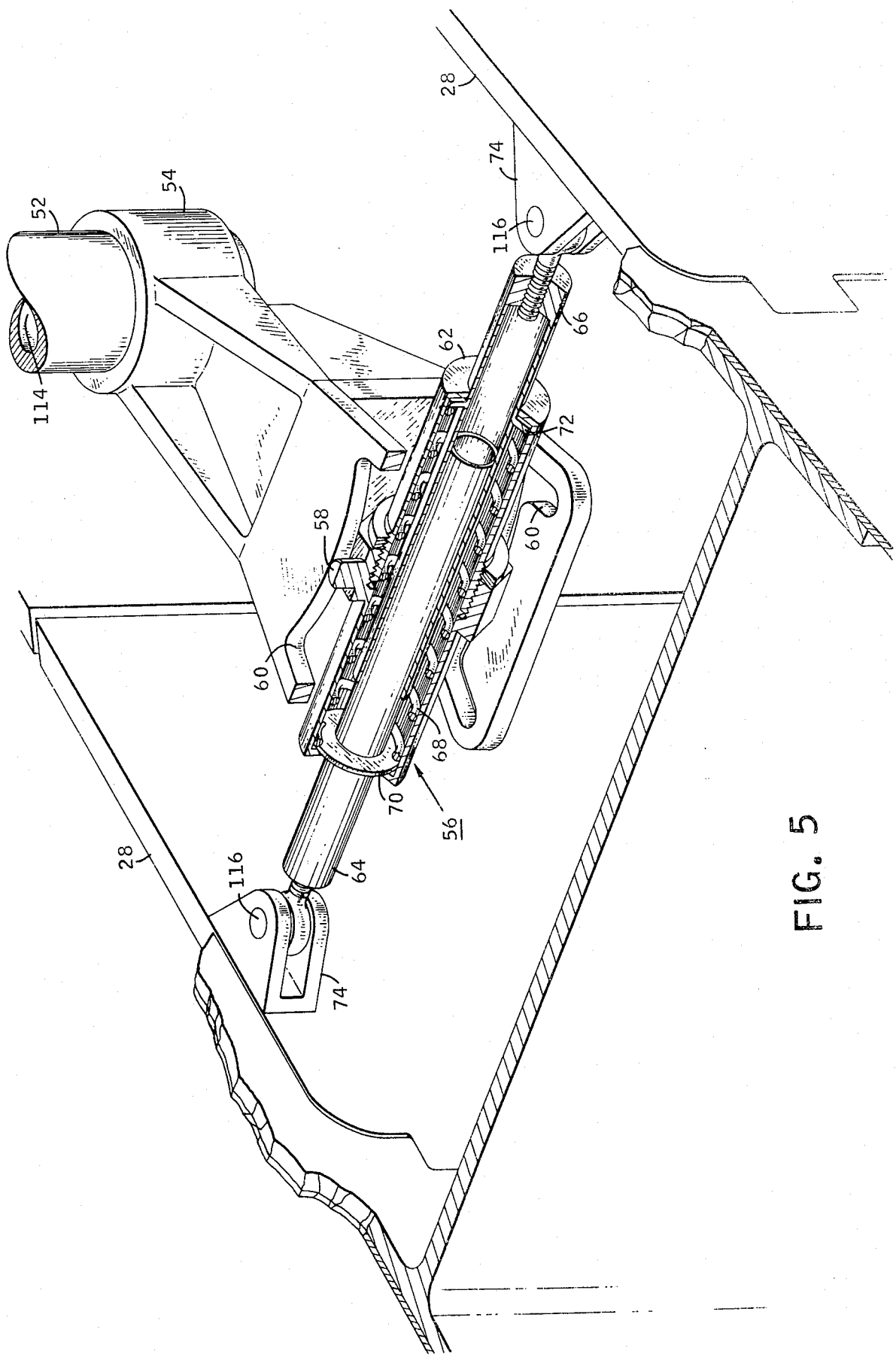
FIG. 5 is an enlarged view of the entrance door positioning mechanism.

Positioned within each yoke 54 is an inlet door positioner assembly 56 which is shown enlarged and partially sectioned in FIG. 5. Door positioner 56 is connected to yoke 54 by two cam follower pins 58 which engage identical cam slots 60 located in the upper and lower surfaces of yoke 54. Door positioner 56 comprises an outer sleeve 62, cam follower pins 58, two rods 64 and 66, and a compression spring 68. Rod 64 is adapted to telescope within rod 66 and both rods are adapted for connection to opposite inlet doors 28 by means of brackets 74 and are free to rotate around pivots 116. Flange 70 of telescoping rod 64 is disposed within outer sleeve 62 in abutment with compression spring 68, and in a like manner flange 72 of telescoping rod 66 bears against the opposite end of compression spring 68.

It will be observed that yoke 54 is shown in the neutral position in both FIGS. 4 and 5 and that for small rotational movements of yoke 54 to either side of neutral, corresponding to low rudder 24 deflections, cam follower pins 58 slide within the arc portion of cam slots 60 that is concentric with the center of rotation 114 of torque tube 52, resulting in no displacement of outer sleeve 62. Compression spring 68 is sufficiently preloaded against flanges 70 and 72, which are integral with telescoping rods 64 and 66 respectively, to maintain entrance doors 28 in the closed position for low rudder deflections.

Further rotation of yoke 54, corresponding to large deflections of rudder 24, causes the radial slot portion of cam slots 60 to engage cam follower pins 58, thereby displacing outer sleeve 62. When the end of outer sleeve 62 bears upon flange 70 of telescoping rod 64, causing rod 64 to move with sleeve 62 and to telescope further into rod 66, the entrance door connected to rod 64 is caused to hinge inwardly. The resulting additional compression of spring 68 between flanges 70 and 72 results in additional force being imposed on the opposite entrance door by rod 66 to maintain that door in the closed position. The additional force stored in compression spring 68 also assures closure of the entrance door attached to rod 64 when yoke 54 rotates toward neutral with decreasing rudder deflection. In a like manner the entrance door attached to rod 66 is opened inwardly whenever the end of outer sleeve 62 contacts sleeve 72 and telescopes rod 66 further over rod 64.

Referring specifically to FIGS. 3 and 4, the invention is as follows: as actuator 32 extends, rotation of torque tube 36 around primary pivot 104 is caused by crank 34. Rotation of crank 34 also causes rotation of crank 40 around primary pivot 104, thereby resulting in arcual movement of secondary pivot 106 and aft linear movement of pivot 108 of track roller 44 until the rudder is in position 24b, shown by dashed lines in FIG. 3. Rotation of crank 34 has also caused horn 50 to rotate torque tube 52 around pivot 114, due to the interconnecting of horn 50 and crank 34 by control rod 48. The yokes 54 attached to torque tube 52 have rotated sufficiently to engage cam follower pins 58 in the juncture of the concentric slot and radial slot portions of cam slots 60 so that up to this amount of rotation of yokes 54 there has been no displacement of door positioners 56 and all entrance doors 28 remain closed. It will be observed that the rudder in position 24b has translated aft and rotated sufficiently to close up the gap between the leading edge of rudder 24 and the trailing edge of element 22 on the pressure side and to have enlarged this corresponding gap on the suction side. As the actuator 32 continues to extend additional deflection of rudder 24 is caused by more arcual movement of the secondary pivot 106 to position 106c and aft linear movement of roller 44 to position 108c. Additionally, rotation of yokes 54 has caused translation of door positioner 56 by means of cam slots 60 translating cam follower pins 58 to position 58c, and rod 64 has pulled its entrance door inward on the pressure side while rod 66 has maintained its entrance door closed on the suction side. It will now be observed that the gap between rudder 24 and element 22 has remained closed on the pressure side and has significantly increased on the suction side. In a like manner when actuator 32 is compressed from its neutral position the rudder will deflect to the opposite side, opposite entrance doors will open, and the enlarging and closing of gaps will reverse.

Thus, it may be clearly appreciated that the present invention provides an improved rudder system wherein the rudder may be deflected to greater angles without flow separation and drag rise associated therewith, resulting in a smaller rudder size to produce the same side force.

It should be clear from the foregoing that the figures and description herein have been drawn to the basic principle of the invention. Modifications, such as for example the elimination of the inlet door positioning device and substitution of preloaded springs therefor, to permit the doors to operate as "blow-in" doors on the pressure side, may be made in the invention, and additional or modified parts and materials may be utilized to increase or decrease the number of inlet doors, rudder elements, cranks, yokes, and other parts, and the invention is not to be restricted to the specific details, arrangement or number and shape of parts herein set forth, since various modifications may be effected without departing from the spirit and scope of the invention.

Having now described my invention so that others skilled in the art may clearly understand it, I claim:

1. In an aircraft fin and rudder structure, control means comprising:
   a primary pivot carried by said fin;
   a secondary pivot carried by said rudder;
   a crank journaled at one end in said primary pivot and journaled at a second end in said secondary pivot;
   a track carried by said fin and positioned fore and aft substantially at said fin's centerline;

sliding means carried by said rudder to reciprocate within said track;

at least one inlet door carried by said fin in each side skin, said doors hinged along their forward edge to open inward and spring biased outward to a closed position;

an actuator carried by said fin to rotate said crank about said primary pivot, causing said secondary pivot to move in an arc about said primary pivot and said sliding means to move in said track, displacing said rudder aft and rotating said rudder angularly relative to said fin, thereby forming an exit gap between trailing edge of said fin and leading edge of said rudder on the suction side of said rudder;

a yoke journaled in said fin, said yoke containing at least one cam surface;

a cam follower adapted to engage said cam surface;

an inlet door positioner mounted to said cam follower and attached at opposite ends to opposing inlet doors located on each side of said fin; and a rod connecting said yoke to said crank such that rotation of said crank causes rotation of said yoke, rotation of said yoke displacing said door positioner by means of said cam follower to open inwardly said inlet door on the pressure side of said fin.

2. The control means of claim 1, wherein said door positioner comprises:

an outer sleeve carrying said cam follower;

a compression spring located coaxially within said sleeve;

a first rod located coaxially within said compression spring, said rod having a flange for abutting a first end of said compression spring and adapted for pivotal mounting to one of said inlet doors; and a second rod located coaxially within said first rod for telescoping movement therein, said second rod having a flange for abutting a second end of said compression spring and adapted for pivotal mounting to one of said inlet doors.

* * * * *